E. O. BONNER.
ATTACHMENT FOR HAY LADDERS.
APPLICATION FILED JUNE 20, 1916.
1,249,890. Patented Dec. 11, 1917.
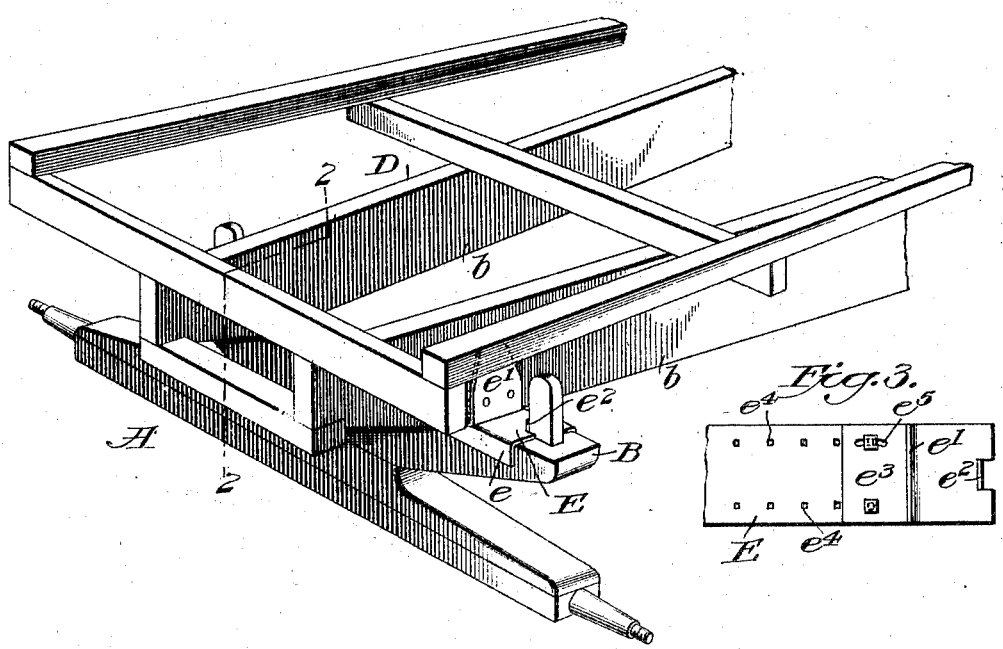
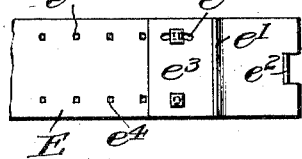
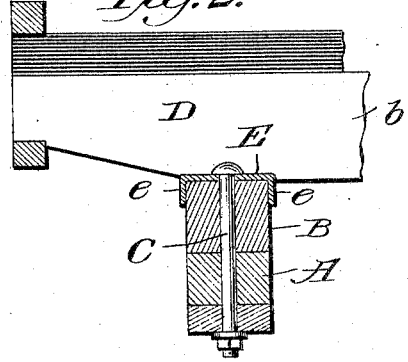

UNITED STATES PATENT OFFICE.

EDWARD O. BONNER, OF GREENFIELD, OHIO.

ATTACHMENT FOR HAY-LADDERS.

1,249,890.

Specification of Letters Patent.

Patented Dec. 11, 1917.

Application filed June 20, 1916. Serial No. 104,649.

*To all whom it may concern:*

Be it known that I, EDWARD O. BONNER, a citizen of the United States, residing at Greenfield, in the county of Highland and State of Ohio, have invented certain new and useful Improvements in Attachments for Hay-Ladders; and I do hereby declare the following to be a full, clear, and exact description of the invention, such as will enable others skilled in the art to which it appertains to make and use the same.

This invention relates to means for attaching hay racks or ladders and wagon beds to the running gear of a vehicle.

The object of my invention is to provide a simple, inexpensive and efficient device of the character referred to designed to be mounted on the bolster of a wagon or other vehicle and secured thereto by engagement with the bolster and standards, and adapted to connect the same with hay racks or ladders of different widths and in such manner that the two parts are firmly secured together and braced and held against both longitudinal and lateral or sidewise movement, either with or without the usual king bolt; said device being so constructed as to prevent injury to or wear upon the standards by contact with sharp edges.

The invention will first be hereinafter more particularly described, with reference to the accompanying drawings, which form a part of this specification, and then pointed out in the claims at the end of the description.

In said drawings, Figure 1 is a perspective view of the front axle and bolster of the running gear of a vehicle and the front portion of a hay rack or ladder mounted thereon with my improvement attached;

Fig. 2 is a detail sectional view, taken on the line 2—2 of Fig. 1;

Fig. 3 is a detail plan view of an end-portion of the attachment shown in Fig. 1.

Referring to said drawings, in which the same reference letters are used to denote corresponding parts in different views, the letter A may denote the front axle of the running gear of a vehicle and B the bolster secured thereon by means of the usual king bolt C. The letter D may denote the front portion of a hay rack or ladder resting upon said bolster, and E my improved attachment whereby the hay rack or ladder may be easily secured to the running gear and is adapted to be removed therefrom without removing any fastening bolts other than the usual king bolt when the latter is used. The said attachment preferably consists of a channeled steel or pressed steel plate, said plate having pendant longitudinal marginal flanges $e$ and attached portions $e^1$ of angular or L-shaped form, to provide angle-plates having a part extending upwardly and perforated to receive fastening bolts by which it may be secured to the sills $b$, of the hay rack or ladder D, or corresponding part of a flat wagon bed and a base portion secured to the flanged plate, the latter being adapted to fit over the front bolster, as shown; said bolster fitting within the recess or channel formed by the pendant flanges of said plate. The channeled plate is of sufficient length to extend the entire width of the bolster between the two standards thereon, rendering it unnecessary to utilize the king bolt to prevent sidewise movement, and has its ends cut or slitted and the cut part turned up to form a recess to receive the standard at each end of the bolster, and an upturned flap $e^2$ abutting the standard, to prevent injury thereto by contact with a sharp edge. The angle plate $e^1$ has a base portion $e^3$ adjustably secured to the channeled plate by means of fastening bolts and a series of perforations $e^4$ to receive said bolts for uniting the two parts. As shown in Fig. 3, the angle plate is provided with an arc-shaped slot $e^5$ to receive one of the bolts by which it is secured to the channeled plate E, in order that the angle plate may be adjusted to bring the upright portions $e^1$ at opposite ends of the channeled plate into alinement with the sills of the hay rack which, as usually constructed, are inclined inwardly at their front ends. A series of spaced perforations are provided at each end of the channeled plate to receive the fastening bolts by which the angle plates are secured thereto, in order that said angle plates may be adjusted and secured at different distances apart to adapt the device for use with hay racks or ladders and wagon beds of different widths.

As the channeled plate extends the full length of the bolster with its upturned flaps abutting the standards thereon, which are confined in the recesses in the ends of the channeled plate, the hay rack will be held against sidewise movement by the engagement of the ends of the channeled plate with the standards, in which case the use of the king bolt to prevent sidewise movement is unnecessary, but it may be desirable in some cases to provide the channeled plate with a centrally disposed aperture, as shown, to receive the usual king bolt.

While the attachment is preferably constructed of channeled or pressed steel, any other suitable metal may be employed, and the series of holes or apertures therein for securing the angle plates thereto may be either square or round, according to the shape of the bolts used.

Having thus described my invention, what I claim as new and desire to secure by Letters Patent of the United States is:

1. As a means for securing a hay ladder or wagon bed to the running gear of a vehicle, an oblong metal plate having pendant longitudinal marginal flanges and its ends slitted and a portion thereof upturned to provide a recess at each end to receive the standards at opposite ends of the bolster and an upturned flap abutting each standard, said plate being also provided with a series of apertures at or near each end, and angle plates secured to said apertured ends having upright apertured portions for attachment to the sills of the ladder or wagon bed.

2. As a means for securing a hay ladder or wagon bed to the running gear of a vehicle, an oblong metal plate having on the underside thereof longitudinal marginal flanges and its ends slitted and a portion thereof upturned to provide recesses to receive the standards at opposite ends of the bolster and upturned portions abutting the standards; said plate having a series of apertures at or near each end, and angle-plates having upright portions secured to said apertured ends and adapted for attachment to the sills of the ladder or wagon bed; said angle-plates being pivotally secured to said oblong plate at one side thereof and having arc-shaped slots therein at the other side to receive the fastening bolts whereby said angle-plates may be adjusted and secured to said oblong plate with the upright portions arranged at different angles thereto.

3. Means for attaching a hay ladder or wagon bed to the running gear of a vehicle, comprising an oblong metal plate having depending longitudinal marginal flanges and upright end-portions formed by slitting the metal plate and upturning the slitted portions to provide at each end an upright portion and an adjacent recess adapted to receive an adjacent standard and provide an abutment therefor by means of said upturned part, thereby preventing injury to the standard by contact with a sharp edge; said metal plate having a series of spaced apertures therein at each end and angularly adjustable angle-plates bolted thereto; said angle-plates having base portions secured to and laterally adjustable upon said oblong plate and having upright portions adapted to be attached to the sills of the ladder or wagon bed at an angle to the wagon bolster.

In testimony whereof I affix my signature in the presence of two witnesses.

EDWARD O. BONNER.

Witnesses:
M. A. MILLIGAN,
JENNIE M. BONNER.

Copies of this patent may be obtained for five cents each, by addressing the "Commissioner of Patents, Washington, D. C."